United States Patent [19]

Long, Jr. et al.

[11] Patent Number: 5,044,824
[45] Date of Patent: Sep. 3, 1991

[54] METHOD AND APPARATUS FOR LOCATING A SERVICE PIPE OUTLET TRANSVERSELY CONNECTED TO A LINED MAIN PIPE

[75] Inventors: Charles A. Long, Jr.; Todd W. Goodwin, both of Birmingham, Ala.

[73] Assignee: Long Technologies, Inc., Birmingham, Ala.

[21] Appl. No.: 517,121

[22] Filed: May 1, 1990

[51] Int. Cl.$^5$ ............................................. E03F 3/06
[52] U.S. Cl. ................................... 405/156; 156/287; 405/154
[58] Field of Search ............... 405/154, 156, 157, 184; 166/55; 138/97; 156/287, 294; 409/143

[56] References Cited

U.S. PATENT DOCUMENTS

| | | | |
|---|---|---|---|
| 2,971,259 | 2/1961 | Hahnau et al. | 33/1 |
| 3,230,129 | 1/1966 | Kelly | 156/287 |
| 3,718,978 | 3/1973 | Van Koevering et al. | 138/97 X |
| 3,927,164 | 12/1975 | Shimabukuro | 264/95 |
| 4,009,063 | 2/1977 | Wood | 156/71 |
| 4,064,211 | 12/1977 | Wood | 264/95 |
| 4,125,089 | 11/1978 | Reusser | 138/97 X |
| 4,135,958 | 1/1979 | Wood | 156/199 |
| 4,182,262 | 1/1980 | Everson et al. | 118/44 |
| 4,197,908 | 4/1980 | Davis et al. | 166/55 |
| 4,385,885 | 5/1983 | Wood | 425/387.1 |
| 4,434,115 | 2/1984 | Chick | 264/36 |
| 4,442,891 | 4/1984 | Wood | 166/55.2 |
| 4,446,181 | 5/1984 | Wood | 428/36 |
| 4,577,388 | 3/1986 | Wood | 166/55 X |
| 4,630,676 | 12/1986 | Long, Jr. | 166/55 |
| 4,668,125 | 5/1987 | Long, Jr. | 405/154 |
| 4,685,983 | 8/1987 | Long, Jr. | 156/64 |
| 4,724,108 | 2/1988 | Jurgenlohmann et al. | 405/154 X |
| 4,776,370 | 10/1988 | Long, Jr. | 138/98 |
| 4,986,314 | 1/1991 | Himmler | 138/97 |

Primary Examiner—Dennis L. Taylor
Attorney, Agent, or Firm—Panitch Schwarze Jacobs & Nadel

[57] ABSTRACT

A remotely controlled locator material dispensing apparatus for use within a conduit having an axis to mark specific conduit locations for later identification. The apparatus includes a control device located outside of the conduit for generating a plurality of control signals for controlling the operation of the locator material dispensing apparatus. The dispensing apparatus includes a first structural unit having a source of locator material to be dispensed onto an interior surface of the conduit. The first structural unit is connected to the control device for receiving the control signals therefrom, and for dispensing the locator material from the first structural unit onto the interior surface of the conduit in accordance with the received control signals. A monitor is positioned within the conduit for locating the specific conduit locations and monitoring the dispensing of the locator material.

9 Claims, 6 Drawing Sheets

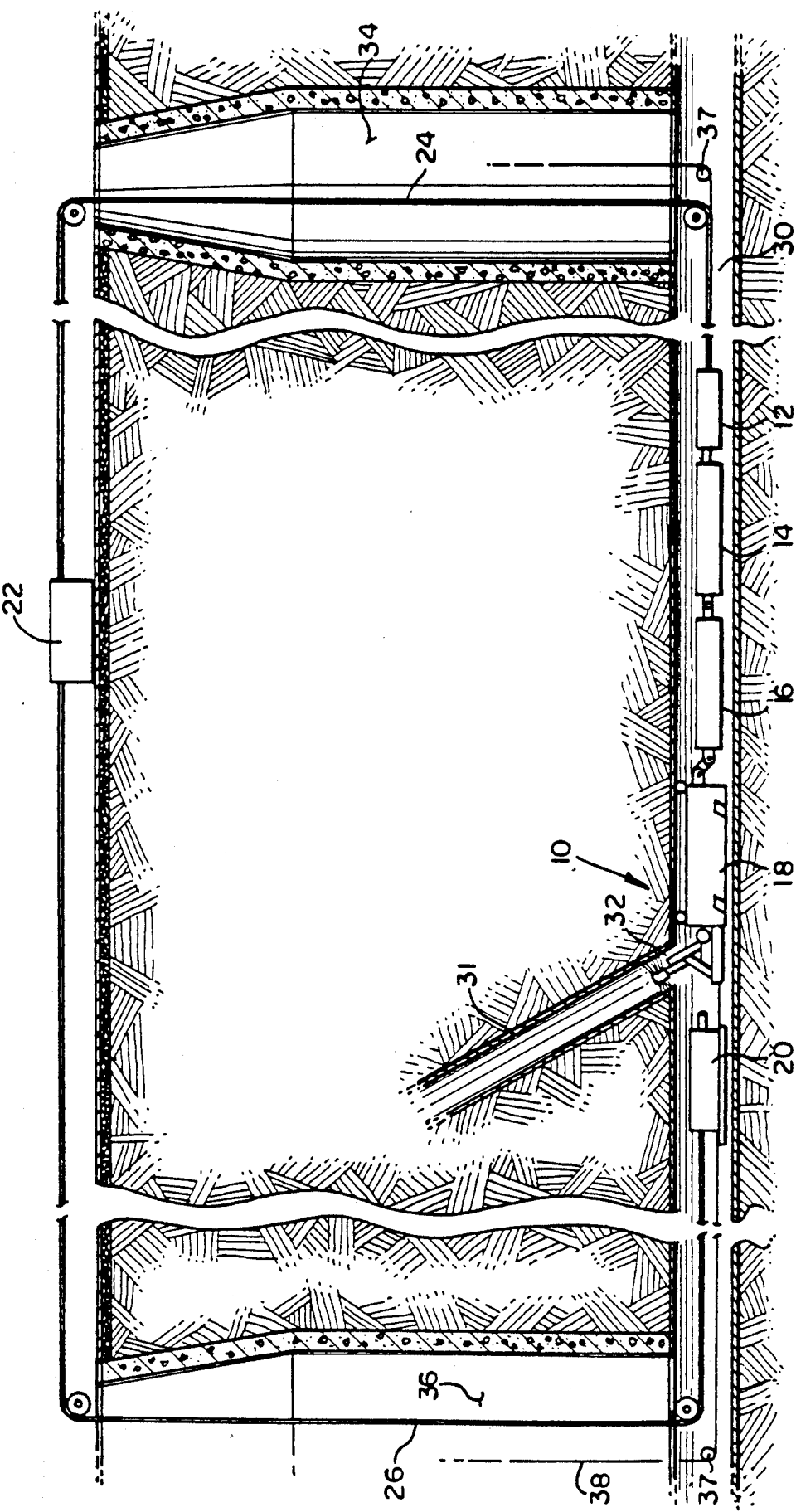

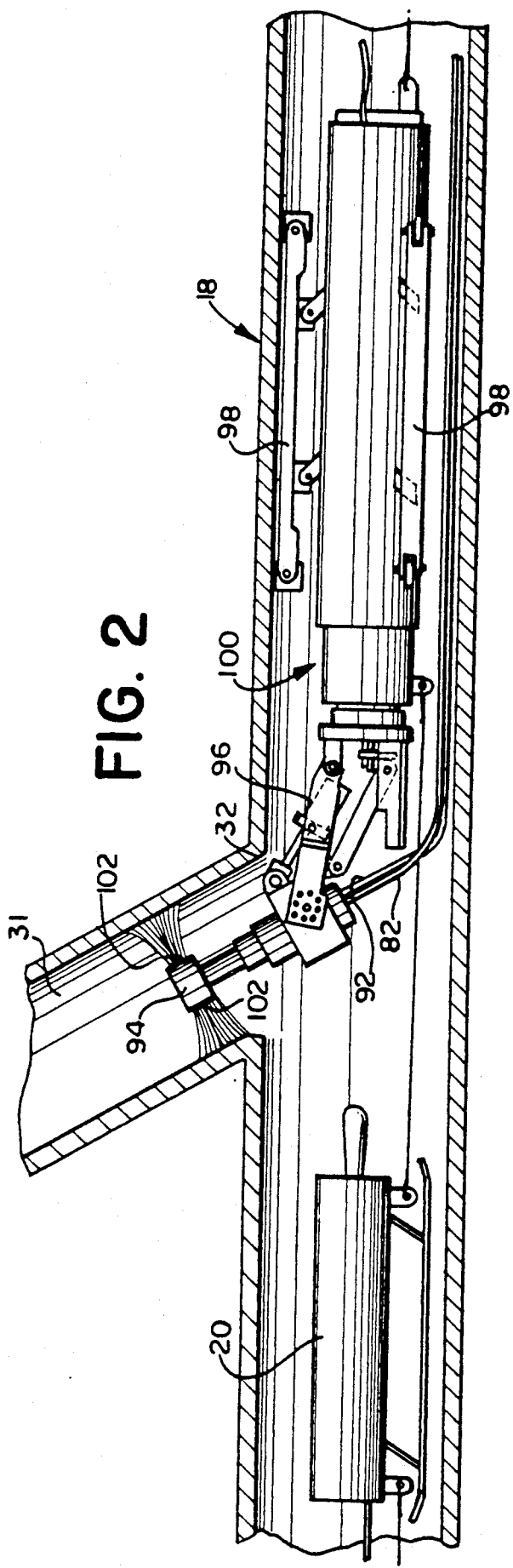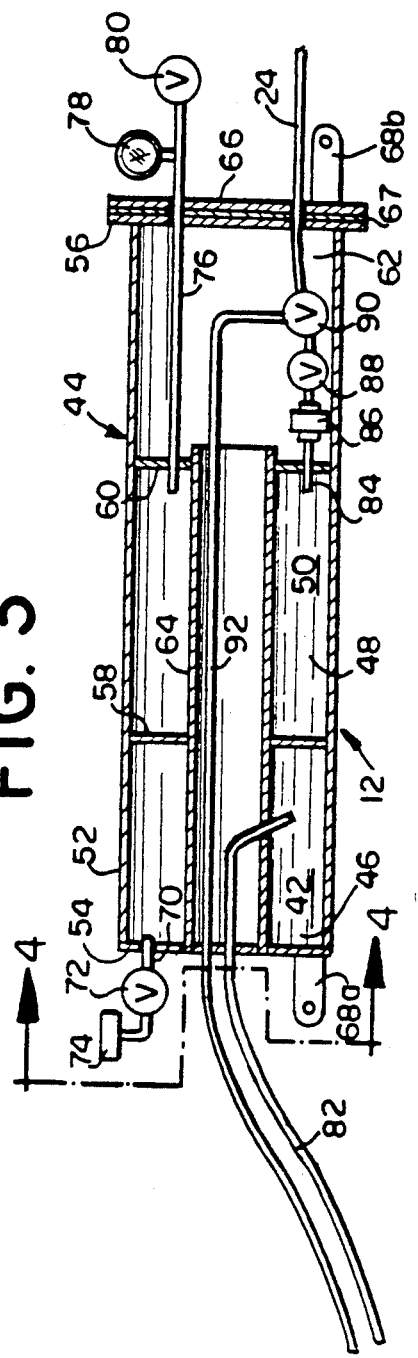

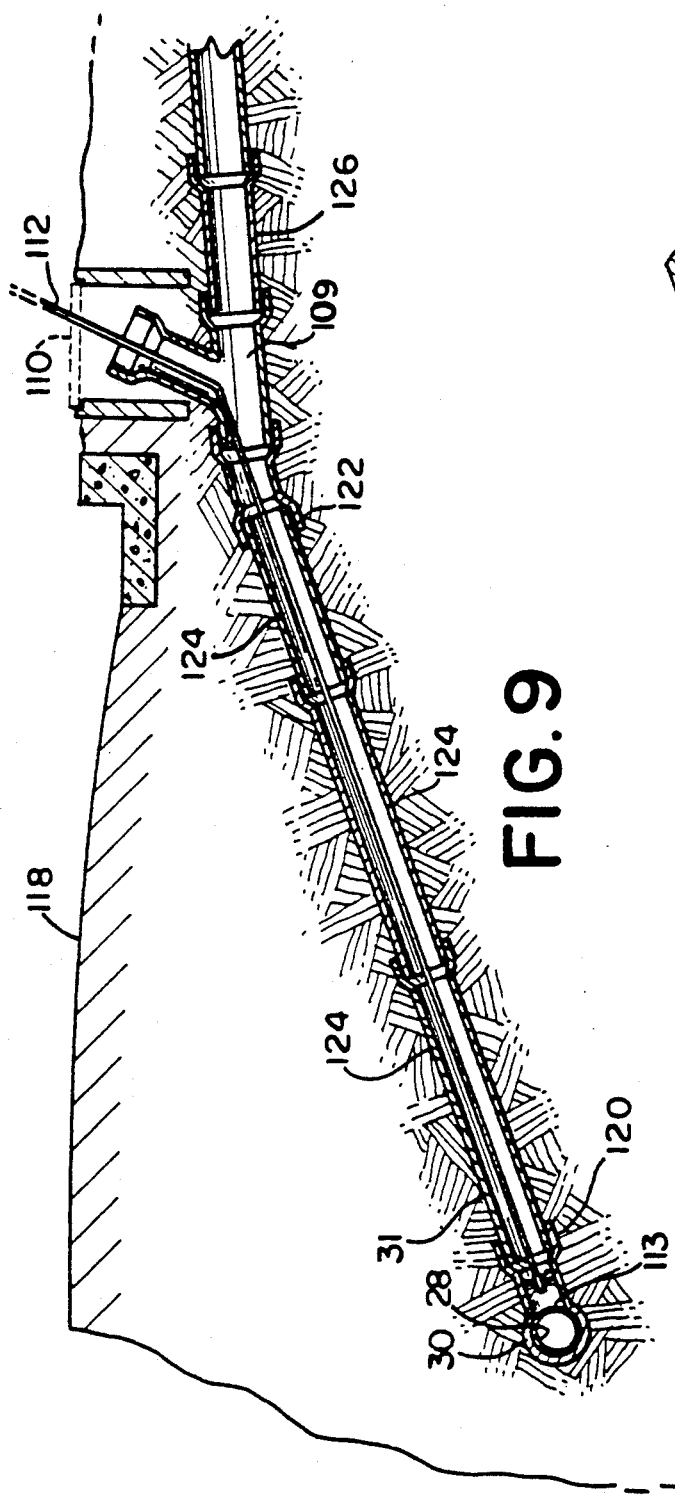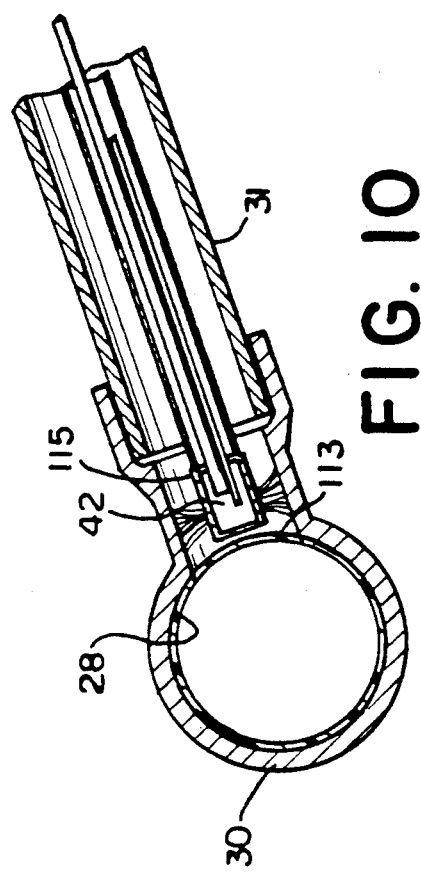

METHOD AND APPARATUS FOR LOCATING A SERVICE PIPE OUTLET TRANSVERSELY CONNECTED TO A LINED MAIN PIPE

FIELD OF THE INVENTION

The present invention relates generally to a method and apparatus for locating a service pipe oulet transversely connected to a lined main pipe and, more particularly, to a remotely controlled locator material dispensing apparatus for use within a main pipe having an axis to mark specific service pipe outlet locations for later identification after a flexible liner has been installed in the main pipe.

BACKGROUND OF THE INVENTION

It is generally well known that conduits or pipes which are employed for conducting fluids, for example, sanitary sewer pipes, storm sewer pipes, water lines and gas lines, frequently require repair due to leakage. The leakage may be inwardly, from the environment into the pipe, or outwardly, from the pipe into the environment. Leakage of this type may be due to improper initial installation of the pipe, deterioration of the pipe itself due to aging or the effects of corrosive materials, cracking of the pipe or pipe joints due to environmental conditions such as earthquakes or similar natural or man-made vibrations, or any other such causes. Regardless of the cause, such leakage is undesirable, at best, and may result in waste of the fluid being carried by the pipe, damage to the environment and the possible creation of public health hazards.

Because of ever increasing labor and machinery costs, it is becoming increasingly more difficult, at least economically, to dig up and replace those pipes or portions of pipes which may be leaking. As a result, various methods have been devised for the in situ repair or rehabilitation of the existing pipes, thereby avoiding the expenses and hazards involved in digging up and replacing the pipes. One of the most successful of such repair or rehabilitation processes which has been developed is called the Insituform process, which is described in U.S. Pat. Nos. 4,009,063; 4,064,211; and 4,135,958, the contents of which are hereby incorporated by reference.

Briefly, in the Insituform process, an elongated flexible tubular liner comprised of a felt or similar material which is impregnated with a thermosetting synthetic resin is installed within the existing pipe utilizing an inverting process as described in the aforesaid patents. Before the liner is positioned within the existing pipe, it is standard procedure to make a final television inspection of the conduit prior to the installation of the flexible tubular liner. During this television inspection, a video tape record, usually with voice comments, is made of the existing conduit which lists each service connection or service pipe outlet, noting the size of the opening and the position of the opening and the distance of the opening from the center point of a downstream manhole.

Once the liner is in place within the pipe, the liner is pressurized from within, preferably utilizing a high temperature fluid, to force the liner radially outwardly to engage and conform to the interior surface of the pipe. While the pressure is maintained, the resin is cured to form a relatively hard, tight-fitting, rigid pipe lining which effectively seals any cracks, and repairs any pipe or joint deterioration to prevent further leakage either into or out of the pipe.

When such a liner is installed in a pipe, such as a sanitary sewer main, which includes a plurality of connecting service entrances or service pipe outlets, such as smaller laterals which carry sewage from individual sources into the main pipe, all of the service pipe outlets or laterals are effectively covered over and sealed by the liner. It, therefore, becomes necessary to either gain access to the service pipe outlets, in order to cut holes through the liner, or to provide a remotely controlled means to locate and cut out the portion of the liner that covers over the service pipe outlet or lateral entrances.

Prior art cutters which have been previously employed for this purpose are described in the U.S. Pat. Nos. 4,197,908 and 4,819,721, which are hereby incorporated by reference. Generally, after the flexible liner is installed, a television camera is installed in the new flexible liner in conjunction with a remotely controlled cutting device. The camera and cutting device are activated to survey or scan the interior surface of the main pipe to provide a visual display for the operator. The camera and cutting device are slowly pulled forward along the main pipe by a cable. The video camera scans the interior of the main pipe until the presence of a service pipe outlet or lateral is detected. The presence of a service pipe outlet can normally be detected by the camera since a depression or dimple generally forms over the service pipe outlet opening due to the pressures imposed upon the liner during curing and the lack of support over the service pipe outlet opening. Thus, the presence of a generally circular dimple or indentation having a diameter which approximates that of a sewage service pipe outlet within the liner indicates the presence of a connecting service pipe outlet which must be opened to permit the free flow of sewage into the sewer pipe.

However, on occasion it is difficult to locate the service pipe outlets because the dimple or indentation is not always readily locatable or identifiable and, accordingly, much time and effort is devoted to this operation significantly increasing the cost of installing the liner.

The present invention overcomes many of the disadvantages inherent in the above-described method for locating the service pipe outlets by providing a remotely controlled locator material dispensing apparatus which dispenses locator material onto an interior area of the main pipe before it is lined. After a flexible tubular liner is installed within the main pipe, a sensor is provided for readily sensing the location of the locator material and, hence, the service pipe outlets. Consequently, the method and apparatus of the present invention allows the service pipe outlets to be easily, readily and positively located. The present invention further provides an alternate method for locating service pipe outlets where the service pipe includes a cleanout (access device). In this alternate method, the flexible liner is first installed in the main line and using the cleanout, locator material is applied to the back side of the flexible liner that spans each service pipe outlet. Thus, use of the present invention results in considerable savings in time and expense for the installation of flexible tubular liners within conduits.

SUMMARY OF THE INVENTION

Briefly stated, one aspect of the present invention comprises a remotely controlled locator material dispensing apparatus for use within a conduit having an axis to mark specific conduit locations for later identification. The locator material dispensing apparatus includes control means located outside of the conduit for generating a plurality of control signals for controlling the operation of the locator material dispensing apparatus. A first structural unit is provided and includes a source of locator material to be dispensed onto an interior surface of the conduit. The first structural unit is connected to the control means for receiving the control signals therefrom, and for dispensing the locator material from the first structural unit onto the interior surface of the conduit in accordance with the received control signals.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings embodiments which are presently preferred, it being understood, however, that the invention is not limited to the specific methods and instrumentalities disclosed. In the drawings:

FIG. 1 is an elevational view of a first preferred embodiment of a remotely controlled locator material dispensing apparatus in accordance with the present invention installed within a subterranean sewer pipe;

FIG. 2 is an enlarged elevational view of a portion of the apparatus of FIG. 1 showing the fourth structural unit and monitoring device;

FIG. 3 is a greatly enlarged elevational view, partially in section of the first structural unit of the apparatus shown in FIG. 1;

FIG. 9 is a partial cross-sectional view of a typical street, illustrating a main sewer pipe and a service pipe transversely connected thereto showing a push-in dispensing apparatus therein; and FIG. 10 is an enlarged view of the lower end of the push-in dispensing apparatus and main pipe shown in FIG. 9.

DESCRIPTION OF PREFERRED EMBODIMENTS

Figure 4:
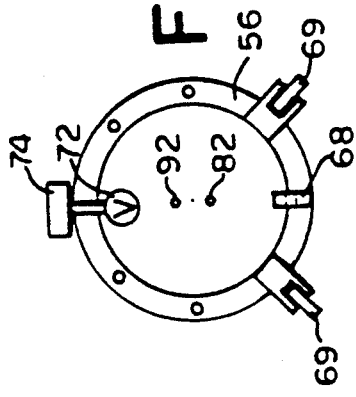
FIG. 4 is a sectional view of the first structural unit taken along line 4—4 of FIG. 3.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the device and designated parts thereof. The terminology includes the words above specifically mentioned, derivatives thereof and words of similar import.

Referring to the drawings in detail, wherein like numerals indicate like elements throughout, there is shown in FIG. 1 a schematic representation of a first preferred embodiment of a remotely controlled locator material dispensing apparatus (hereinafter referred to as "dispensing apparatus"), generally designated 10, for use within a conduit having an axis to mark specific conduit or service pipe outlet locations for later identification. The dispensing apparatus 10 of the present invention is comprised of five separate structural units or assemblies 12, 14, 16, 18 and 20, which are sequentially coupled or attached together end-to-end for concurrent movement in a manner which will hereinafter become apparent. Each structural unit 12, 14, 16, 18 and 20 includes one or more functional subassemblies of the dispensing apparatus 10, as is hereinafter described in greater detail.

The dispensing apparatus 10 further comprises a sixth structural unit which is comprised of a control assembly or control means 22 which is positioned in a location remote from the other five structural units 12, 14, 16, 18 and 20, and is connected thereto by suitable connecting means, such as one or more multiple conductor electrical cables 24 and 26. Further details concerning the structure and operation of the control assembly 22 is hereinafter presented.

In the presently preferred first embodiment, the dispensing apparatus 10 is employed for the purpose of premarking specific service pipe outlet locations for later identification. Preferably, the dispensing apparatus 10 is used in conjunction with a thermosetting polymeric lining 28, which is installed and cured within a conduit or pipe, for example, an underground or otherwise inexcessible conduit shown in the present embodiment as a sewer or main pipe 30. As discussed briefly above and in U.S. Pat. Nos. 4,630,676 and 4,819,721, a cutter apparatus is employed for locating and cutting through a portion of the liner 28, which typically blocks or partially blocks the entrance to a connecting lateral or service pipe outlet 32, and thereby prevents the free flow of sewage or the like therethrough.

In the present embodiment, for the purpose of illustrating the operation of the dispensing apparatus 10, the service pipe outlet 32 of the service pipe 31 is shown in FIG. 1 as being connected to the main pipe 30 from above and at an angle of approximately 60 degrees from the longitudinal axis of the main pipe 30. However, it is appreciated by those skilled in the art, that the service pipe outlet 32 could enter the main pipe 30 at any other position around the circumference of the main pipe 30 or at any other angle with respect to the axis of the main pipe 30. In fact, in many instances, the service pipe outlet 32 is generally level with or slightly above the main pipe and at about a 90° angle with respect to the axis of the main pipe 30.

The dispensing apparatus 10 is particularly useful in connection with sewer pipes or other conduits having a relatively small diameter, on the order of seven and one-half inches inside diameter, a size which is insufficient to permit the marking and cutting of the liner 28 in any other conventional manner, without having to dig up the main pipe 30. Due to the relatively small size of the main pipe 30, the outside dimensions of the five structural units 12, 14, 16, 18 and 20, may not exceed four and three-quarters inches in diameter in order to provide sufficient clearance for movement within the main pipe 30 without damaging the dispensing apparatus 10 or the liner 28.

Referring to FIG. 1, to move the dispensing apparatus 10 within the main pipe 30, the first five structural units, 12, 14, 16, 18 and 20 are initially installed within the main pipe 30 by way of a conventional downstream manhole 34 and upstream manhole 36, typically four feet in inside diameter. The five units 12, 14, 16, 18 and 20 are attached together end-to-end for cooperative movement along the main pipe 30 using flexible or bendable attachments, as described in U.S. Pat. No. 4,819,721 to give the dispensing apparatus 10 sufficient flexibility to permit the various units to be manipulated around curves or dips within the main pipe 30.

The forward or front (left end) end of the fifth structural unit 20 includes suitable attachment means, such as an eye bolt (not shown in FIG. 1), for attaching a suitable movement means, such as a steel cable 38, for pulling the interconnected units 12, 14, 16, 18 and 20 forward (toward the left) along the main pipe 30. Correspondingly, the back or rear (right) end of the first structural unit 20 includes a similar attachment means for attaching a similar movement means, such as a steel cable 40, to permit the connected structural units 12, 14, 16, 18 and 20 to be pulled along the main pipe 30 in the other (right) direction. The steel cables 38 and 40 may be manually pulled in either direction by an operator located within the manhole, or by utilizing suitable pulleys 37 and an operator on the surface. Alternatively, the steel cables may be connected to suitable mechanical movement means (not shown) whcih may be hand- or-motor-driven, and which may be located within the manholes 34 and 36 or on the surface. Similarly, the movement and position of the dispensing apparatus 10 can be remotely controlled by the control assembly 22, described hereinafter.

Referring now to FIG. 1, as mentioned previously, the control assembly 22 is located outside of the conduit or main pipe 30 for generating a plurality of control signals which control the operation of the dispensing apparatus 10. In the first preferred embodiment, the control assembly 22 is preferably located on the surface, as shown in FIG. 1. The generated control signals are preferably electric signals, to provide a means for an operator to remotely control the entire operation of the dispensing apparatus 10 within the main pipe 30 from the surface.

In the presently preferred first embodiment, the control assembly 22 is positioned within a central control station (not shown) located on the surface. As is understood by those skilled in the art, the central control station typically consists of a truck, which includes television monitoring equipment, radios, power supply and control winches for cables, control lines and power lines for the complete operation of the present invention.

The control assembly 22 used in connection with the present apparatus, is generally the same or along the lines of the control assembly disclosed in U.S. Pat. No. 4,819,721, which is incorporated by reference and understood by those skilled in the art. The difference between the control assembly disclosed in U.S. Pat. No. 4,819,721 and that utilized in the present invention, are minor and can be compensated for with slight programming modifications as is understood by those skilled in the art. Consequently, further detailed description of the control assembly 22 is not believed to be necessary and, therefore, for convenience only is not presented herein.

However, suffice it to say that the electrical control signals which are transmitted along cables 24 and 26 to permit an operator located in front of a control panel to remotely control the entire operation of the dispensing apparatus 10 within the main pipe 30. The control means preferably comprises a computer system, including a microprocessor or processor, memory and input-/output sections, suitable computer software, and appropriate wiring and other interconnecting means (not shown) as is understood by those skilled in the art.

Referring now to FIGS. 1 and 3, there is shown a first structural unit 12 including a source of locator material 42 to be dispensed onto an interior area of the main pipe 30 for later identification. That is, the locator material 42 is dispensed onto an interior area of the main pipe 30 which is thereafter lined with the flexible tubular liner 28, as described above. The location of the locator material 42 along the main pipe 30 can then be later identified by sensors or the like.

The present invention is not limited to any particular type of locator material 42. Preferably, the locator material 42 is comprised of a composition of matter which can be sensed or identified through a flexible tubular liner 28 which has been impregnated with a polymeric resin. More particularly, it is preferred that the locator material 42 either emit certain indicia which can be sensed from the other side of the cured liner 28 or can be activated from the other side of the cured liner 28 to emit certain indicia which is detected by a sensor or emitter device located on the other side of the liner 28.

In the first preferred embodiment, it is preferred that the locator material 42 be a material which emits a magnetic flux, such as a liquid including a magnetic particulate or such material interspersed throughout. It is understood by those skilled in the art, that the locator material 42 could be comprised of other compositions of matter, such as a material which emits harmless levels of radiation or, alternatively, could be a material that is activated or detected by light (e.g., infrared, ultraviolet, and laser), sound (e.g., ultrasonic, sonic and sonar) and electrical properties (e.g., conductivity, resistivity, capacitance and density).

As shown in FIG. 1, the first structural unit 12 is connected to the control assembly 22 for receiving the control signals therefrom, and for dispensing the locator material 42 onto the interior surface of the main pipe 30 in accordance with the received control signals.

Referring now to FIG. 3, in the present embodiment the first structural unit 12 includes a housing 44 having a generally annular locator material storage chamber 46 for storing a source of locator material 42 to be dispensed. The first structural unit 12 further includes locator material distributing means positioned on the housing 44 and in fluid communication with the storage chamber 46 for dispensing and distributing the locator material 42. In the first preferred embodiment, the locator material distributing means comprises a generally annular gas chamber 48 and a plurality of conduits and valves in communication with the storage chamber 46, described in more detail hereinafter. Preferably, the gas chamber 48 is positioned within the housing 44 for storing a gas, preferably an inert gas, at a predetermined pressure, as described below.

In the present embodiment, it is preferred that the housing 44 be comprised of a generally tubular member 52 which is preferably generally annular in cross section. Secured to the ends of the tubular member 52 are a pair of end plates 54 and 56. The end plate 54 is generally circular and sized to complement the tubular member 52 to thereby provide a sealed tight fit on the front end. The end plate 56 is generally annularly shaped with an inner diameter which generally corresponds to the inner diameter of the tubular member 52 and an outer diameter greater than the diameter of the tubular member 52 so that end plate 56 extends radially beyond the tubular member 52 to thereby provide a radially extending flange.

Interposed between the end plates 54 and 56 is a first bulkhead 58 spaced apart from a second bulkhead 60. The end plates 54 and 56 and the bulkheads 58 and 60 form three separate chambers, specifically, the material storage chamber 46, the gas chamber 48 and a control chamber 62. The first and second bulkheads 58 and 60 are generally circularly shaped and are sized to complement the inner diameter of the tubular member 52 so as to provide a sealed connection.

As shown in FIG. 3, a small generally cylindrical conduit 64 is generally centrally disposed along the longitudinal axis of the tubular member 52 and extends completely through the storage chamber 46 and the gas chamber 48 and into the control chamber 62 through suitably sized holes in the first and second bulkheads 58 and 60. However, it is understood by those skilled in the art, that the cross section of the small conduit 64 can take the form of other shapes, such as square, triangular or octagonal. In addition, it is also understood by those skilled in the art, that the small conduit 64 can be eccentrically disposed within the tubular member 52, without departing from the spirit and scope of the invention.

As shown in FIG. 3, the first structural unit 12 includes a suitably sized generally disk-like coverplate 66 secured to the end plate 56 with sealing means positioned therebetween. In the first preferred embodiment, the sealing means comprises a standard gasket 67 formed of neoprene or a similar material, as is understood by those skilled in the art, for preventing fluid from passing between the coverplate 66 and the end plate 56. Preferably, the coverplate 66 and the gasket 67 have an outer periphery which generally corresponds to the outer diameter of the end plate 56, as shown in FIG. 3. The coverplate 66 and the flange area of the end plate 56 include suitably aligned and sized holes for receiving standard fasteners (not shown) (e.g., nuts, bolts, washers, etc.) therethrough to interconnect the coverplate 66 and end plate 56 with the gasket 67 therebetween.

Connected to the end plate 54 and the coverplate 66 are a pair of pull connectors 68a and 68b, respectively, for receiving a cable (not shown) for pulling the first structural unit 12 through the main pipe 30, as described above. In the present embodiment, it is preferred that the pull connectors 68 be comprised of eye bolts for receiving a hook or cable therethrough. More particularly, it is preferred that the pull connector 68b be connected to the cable 40 extending through the downstream manhole 34. Similarly, the pull connector 68a is connected to a cable (not shown) which extends between the first structural unit 12 and the second structural unit 14 for allowing the first and second structural units 12, 14 to move concurrently within the main pipe 30.

Referring now to FIG. 4, the first structural unit 12 includes means for allowing the first structural unit 12 to freely move within the main pipe 30. In the present embodiment, such means is a pair of wheels 69 positioned along the bottom of the first structural unit 12 for engagement with the interior surface of the main pipe 30.

It is preferred that the wheels 69 be constructed of a typical synthetic dampening material, such as rubber. However, it is understood by those skilled in the art, that the wheel 69 could be constructed of other materials such as a polymeric or metallic material.

The wheels 69 are preferably mounted on the first structural unit in a manner within the ambit of one skilled in the art and, therefore, further description thereof is not believed to be necessary and is not limiting. However, it is understood by those skilled in the art, that other means could be used for allowing the first structural unit 12 to readily move within the main pipe 30, such as pair of runners or rails (e.g., see the rails on the fifth structural unit 20 shown in FIG. 2).

Unless otherwise indicated, the above-described elements of the first structural unit 12 are constructed of a lightweight high strength metallic material, such as steel. However, it is understood by those skilled in the art, that the first structural unit 12 could be constructed of other materials, such as a polymeric material like polyvinylchloride.

In the first preferred embodiment, the various elements of the first structural unit 12 are preferably interconnected through standard connecting means, such as welding. For instance, holes (not shown) can be drilled through the tubular member 52 for allowing the bulkheads 58 and 60 to be plug welded thereto followed by a seal weld therebetween. However, it is understood by those skilled in the art, that the interrelated parts can be connected together by other means, such as standard fasteners or the like.

Referring now to FIGS. 3 and 4, in the present embodiment, the end plate 54 includes a fill conduit 70 sealingly extending through a suitably sized hole into the storage chamber 46. The fill conduit 70 is preferably threadably connected to a manual valve 72, which is in turn connected to a fill cap 74. To fill the storage chamber 46, the valve 72 and fill cap 74 are placed in the open position and the locator material 42 is deposited into the fill cap 74 so that it flows through the valve 72, fill conduit 70 and into the storage chamber 46. After the storage chamber 46 is filled with locator material 42 to a desired level, the fill cap 74 and valve 72 are placed in the closed position.

In the present embodiment, a gas fill conduit 76 extends through the coverplate 66, gasket 67, end plate 56, control chamber 62 and second bulkhead 60 into the gas chamber 48. Preferably, the gas fill conduit 76 sealingly extends through suitably sized openings or holes in the coverplate 66, gasket 67, end plate 56 and second bulkhead 60. Threadably connected to the gas fill conduit 76, outwardly of the housing 44, is a pressure gauge 78 and a gas fill valve 80. A compressed gas can be forced into the gas chamber 48 through the gas fill conduit and valve 76, 80 until the pressure gauge 78 indicates that the proper pressure has been attained inside the gas chamber 48.

As mentioned previously, it is preferred that the gas chamber 48 be filled with a compressed inert gas, such as air. However, it is understood by those skilled in the art, that other inert gases can be utilized, such as argon or the like. Moreover, it is preferred that the compressed gas within the gas chamber 48 be maintained at a pressure sufficiently above atmospheric pressure or, where appropriate, above the pressure within the main pipe 30 for allowing the gas 50 to escape therefrom, as described hereinafter.

As shown in FIG. 3, the first structural unit 12 includes a locator material draw tube or conduit 82 for drawing locator material 42 from the storage chamber 46. The draw tube 82 extends inwardly into the tubular member 52 through a suitably sized hole in the end plate 54 into the interior area of the small conduit 64. The portion of the draw tube 82 within the small conduit 64 sealingly extends through a suitably sized opening in a wall of the small conduit 64 into the lower portion of the storage chamber 46 so as to be in fluid communication with the locator material 42.

Positioned within the control chamber 62 is valve means in fluid communication with the gas chamber 48 and connected with the control assembly 22 for receiving the pressurized gas 50 from the gas chamber 48 and the control signals from the control assembly 22, and for distributing the received pressurized gas 50 in accordance with the received control signals. In the present embodiment, the valve means is a solenoid valve and regulator valve assembly, described in more detail hereinafter.

Extending from the gas chamber 48 through a suitably sized hole in the second bulk head 60 into the control chamber 62 is a first gas conduit 84. The first gas conduit 84 is threadably connected to a union 86 which in turn is threadably connected to a regulator valve 88 for regulating the pressure of the gas 50 passing therethrough. The regulator valve 88 is connected to and in fluid communication with a solenoid controlled gas valve 90. Extending from the solenoid gas valve 90, through the small conduit 64 and a suitably sized hole in the end plate 54 outwardly of the housing 44 is a second gas conduit 92.

The solenoid gas valve 90 is in electrical communication with the control assembly 22 through the electric cable 24 extending through the downstream manhole 34. As shown in FIG. 3, the electric cable 24 sealingly extends through suitably sized holes in the coverplate 66, gasket 67 and end plate 56. In this manner, the control assembly 22 can control the on-off operation of the solenoid gas valve 90 from a remote location. The second gas conduit 92 and the draw tube 82 extend outwardly from the housing 44 and travel along the interior of the main pipe 30 and are connected to the fourth structural unit 18, as described in more detail hereinafter.

It is recognized by those skilled in the art, that the various interrelated parts and connections of the first structural unit 12 are such that the locator material 42 and the gas 50 cannot escape from their respective chambers 46 and 48 because of sealing means appropriately and adequately distributed throughout the first structural unit 12. The means for sealing the first structural unit 12 is within the ambit of the ordinarily skilled artisan and, therefore, further description thereof is not necessary or limiting. However, suffice it to say, that, where appropriate, gaskets, silicone compounds and/or welding or other techniques can be used to accomplish this function.

Moreover, the pressure gauge 78 and the various valves and conduits of the first structural unit 12 are standard off-the-shelf items which operate and are interconnected in a manner that is known to those skilled in the art. Consequently, for convenience only, further description of these elements is neither necessary nor limiting.

Referring now to FIG. 1, there is shown a second structural unit 14 which includes a source of pressurized fluid. The details and operation of the second structural unit 14 are completely disclosed in U.S. Pat. No. 4,819,721, the contents of which have been incorporated by reference above. Briefly, in the present embodiment, the second structural unit 14 preferably comprises a source of hydraulic fluid, and includes a hydraulic pump (not shown) and a hydraulic fluid reservoir (not shown). The hydraulic fluid pump and reservoir cooperate to provide a supply of hydraulic fluid under pressure to the third structural unit 16 for subsequent distribution as described in the above-mentioned patent.

As shown in FIG. 1, the second structural unit 14 is coupled to the third structural unit 16 for concurrent movement therewith by coupling means, as mentioned previously. The third structural unit 16 includes valve means or a hydraulic valve subassembly (not shown) in fluid communication with the fluid source of the second structural unit 14 and is connected to the control assembly 22 for receiving pressurized hydraulic fluid from the fluid source of the second structural unit 14 and the control signals from the control assembly 22. The valve means of the third structural unit distributes the received hydraulic fluid in accordance with the received control signals through a plurality of conduits or hydraulic hoses to vary the position of a dispensing head (described hereinafter) of the dispensing apparatus 10.

A complete description of the structure and operation of the third structural unit 16 is set forth in U.S. Pat. No. 4,819,721 and further description thereof herein is neither necessary nor limiting.

As shown in FIG. 1, a fourth structural unit 18 is coupled to the third structural unit 16 by coupling means, as mentioned previously. As shown in FIG. 2, in the present embodiment, the fourth structural unit 18 comprises support means for supporting a dispensing head 94 and hydraulically actuated means in fluid communication with the third structural unit 16 valve means for moving and positioning the support means with respect to the fourth structural unit 18.

Unless otherwise indicated, the fourth structural unit 18 briefly described hereinafter, is generally identical to the structural unit described in U.S. Pat. No. 4,819,721 which includes three subassemblies for positioning the cutter described therein. The primary difference between the fourth structural unit 18 of the present invention and the similar structural unit described in U.S. Pat. No. 4,819,721 is that the fourth structural unit 18 positions the dispensing head 94 as opposed to a hydraulically actuated cutter.

As shown in FIG. 2, the forward (left most when viewing FIG. 2) portion of the fourth structural unit 18 contains the dispensing head supporting subassembly 96 which supports the locator material dispensing head 94. The fourth structural unit 18 also includes a holder subassembly 98 which is employed to hold or secure the fourth structural unit 18 in a fixed, axial position within the main pipe 30 during the locator material dispensing operation, if necessary. In addition, the holder subassembly 98 functions to position and align the fourth structural unit 18 generally along the axial center line of the main pipe 30 to facilitate proper positioning of the dispensing head 94.

The fourth structural unit 18 further includes a dispensing head positioning subassembly 100 for moving the dispensing head supporting subassembly 96 and the dispensing head 94 to permit the dispensing of the locator material 42 on an interior area of the main pipe 30 or within the service pipe outlet 32.

As completely described in U.S. Pat. No. 4,819,721, the above-discussed subassemblies are moved and positioned by hydraulically actuated means which comprises at least five separate hydraulically actuated means, each of which are actuated by hydraulic fluid received from the valve means within the third structural unit.

The first hydraulically actuated means (not shown) positions and holds the holder subassembly 98 at a fixed axial position within the main pipe 30. The second hydraulically actuated means (not shown) is employed for varying the axial position of the dispensing head 94 with respect to the fourth structural unit 18 forward and rearward within the main pipe 30 (toward the left and right, respectively, when viewing FIG. 2) approximately 11 inches. The third hydraulically actuated means (not shown) is for varying the radial position of the dispensing head 94 inwardly and outwardly approximately 5½ inches with respect to the main pipe 30. The fourth hydraulically actuated means (not shown) is for receiving hydraulic fluid from the valve means for rotating the locator material dispensing head 94 up to 180° about the axis of the main pipe 30 in either a clockwise or counterclockwise direction with respect to an initial position (12 o'clock when looking along the axis of the main pipe 30) to permit the dispensing of locator material 42 at various positions around the interior circumference of the main pipe 30. The fifth hydraulically actuated means (not shown) is for pivoting the dispensing head 94 about the axis extending generally perpendicular to the longitudinal axis of the main pipe 30.

As schematically shown in FIG. 2, the fourth structural unit 18 is coupled to the fifth structural unit 20 in the same manner as described above for concurrent movement within the main pipe 30 along with the other structural units. The fifth structural unit 20 includes an audio subassembly and a television or video subassembly which includes a video camera. The camera and video subassembly are employed to determine the location of a service pipe outlet 32 before the main pipe 30 is lined. The camera and video subassembly are used in conjunction with the audio subassembly to serve as the "eyes" and "ears" of an operator located on the surface who is monitoring and/or controlling the dispensing apparatus 10. The camera and video subassembly and the audio subassembly are substantially the same as those employed in the prior art for substantially the same purpose. More specific details of the structure and operational features of the camera and video subassembly and the audio subassembly are not believed to be necessary for a complete understanding of the present invention and, therefore, will not be presented herein.

Referring now to FIG. 2, as mentioned previously, the dispensing head 94 is supported by the support means, or more specifically, the dispensing head supporting subassembly 96, on the fourth structural unit 18. The dispensing head 94 includes at least one outlet port 102 in fluid communication with the source of locator material 42 for receiving the dispensed locator material 42 therethrough. In the present embodiment, the dispensing head 94 preferably includes a pair of outlet ports 102 for dispensing locator material 42 in diametrically opposed directions. However, it is understood by those skilled in the art, that any number of outlet ports can be used for allowing the locator material 42 to be dispensed either in a single concentrated location or on the entire inner periphery of the pipe surrounding the dispensing head 94.

In the present embodiment and as shown in FIGS. 2 and 3, the outlet ports 102 are in fluid communication with the second valve means or solenoid gas valve 90 for receiving the pressurized gas 50 therefrom. Specifically, the second gas conduit 92 extends along the main pipe 30 from the first structural unit 12 past the second, third and fourth structural units, 14, 16 and 18 and is secured to the dispensing head 94, as shown in FIG. 2. Similarly, the dispensing head 94 is also in fluid communication with the storage chamber 46 and the locator material 42. That is, the draw tube 82 extends from the first structural unit 12 to the dispensing head 94 in a manner generally identical to the second gas conduit 92. Thus, when the solenoid gas valve 90 is actuated to an open position by an operator at the control assembly 22 pressurized gas is received by the outlet ports 102 through the second gas conduit 92. The pressurized gas passing through the dispensing head 94 creates a suction or vacuum force within the draw tube 82, as is understood by those skilled in the art. Hence, locator material 42 is drawn from the storage chamber 46 into the outlet ports 102 and is dispensed along with the compressed gas 50.

In U.S. Pat. No. 4,819,721, the supporting subassembly 96 supports a hydraulically actuated cutter motor. The cutter motor is hydraulically actuated for rotation thereof through additional hydraulically actuated means positioned with the cutter motor itself and activated by the valve means of the third structural unit 16. Accordingly, it would be within the ambit of one of ordinary skill in the art, to mount the dispensing head 94 in a hydraulically actuated rotor which could be supported by the dispensing head support assembly 96 to allow the dispensing head 94 to be rotated about its own axis for providing locator material 42 completely around the inner periphery of the pipe being sprayed without having to utilize additional outlet ports or to actuate other hydraulic means.

To operate or use the dispensing apparatus 10 in accordance with the first preferred embodiment, the first structural unit 12 is prepared for operation by opening the fill cap 74 and depositing the selected locator material 42 therethrough into the storage chamber 46 until a desired amount of locator material 42 is deposited therein. A compressed inert gas, preferably air, is forced into the gas chamber 48 through the gas fill valve 80 until the pressure gauge 78 indicates that the desired gas pressure inside the gas chamber 48 is attained.

The remaining structural units 14, 16, 18 and 20 are prepared for operation as described in U.S. Pat. No. 4,819,721. When all of the structural units are prepared for operation, the dispensing apparatus 10 is assembled by connecting the first through fifth structural units 12, 14, 16, 18 and 20 together by the coupling means and placed inside the main pipe 30 through the downstream manhole 34. Alternatively, the first through fifth structural units 12, 14, 16, 18 and 20 can be each independently positioned within the downstream manhole 34 and then connected together by the coupling means and placed inside the main pipe 30.

After the structural units are positioned with the main pipe 30 and the fifth structural unit 20 has been connected to the cable 38, the units are pulled slowly forward (to the left) by the cable 38 until the dispensing head 94 is positioned proximate a service pipe outlet 32.

As the dispensing apparatus 10 is being pulled through the main pipe 30, an operator located proximate the control assembly 22 visually monitors the interior surface of the main pipe 30 from the remote location. Specifically, the operator visually monitors a television monitor which is in communication with the fifth structural unit 20 which includes video means for scanning the interior area of the main pipe 30. When a service pipe outlet is located the movement of the structural units are stopped and the dispensing head 94 is positioned proximate the service pipe outlet 32.

Next, locator material 42 is deposited on an interior surface of the main pipe 30 adjacent the position of the service pipe outlet 32. The locator material 42 may also be deposited on an interior surface of the service pipe outlet 32. It is understood by those skilled in the art, that the present invention is not limited to the specific location of the locator material 42 on the main pipe 30 or on the service pipe outlet 32. That is, the locator material 42 can be deposited on an area proximate the service pipe outlet 32 or therewith in an amount which allows the locator material 42 to be later sensed or located from the opposite side of a flexible tubular liner 28. It is understood by those skilled in the art, that the specific type of locator material used may effect the amount of locator material deposited on the main pipe 30 or service pipe outlet 32, and in what areas thereof it is deposited because of varying degrees of sensitivity. That is, certain locator materials only need a small volume thereof to be sensed from the other side of the liner, whereas others may need a larger application for the same reason.

Specifically, the step of depositing locator material 42 on an interior surface of the main pipe 30 adjacent the position of the service pipe outlet 32 comprises moving the dispensing head 94 by means of the flow of hydraulic fluid to the various hydraulic means as described above. The control assembly 22 is then actuated to send control signals for activating the first structural unit 12, as described above, to deposit the locator material 42 through the dispensing head 94.

Alternatively, the dispensing head 94 could be positioned on one side of the service pipe outlet 32 and adjacent thereto. The fourth structural unit 18 which supports the dispensing head 94 can be fixed axially with respect to the main pipe 30 by the holder subassembly 98 and then the dispensing head 94 can be moved axially within the main pipe 30 by the dispensing head positioning subassembly 100 to the other side of the service pipe outlet 32 and adjacent thereto, while simultaneously depositing the locator material 42 on an interior surface of the main pipe 30 therebetween.

After the first service pipe outlet 32 is located and the dispensing apparatus 10 has deposited the locator material 42, the dispensing apparatus 10 is pulled along the main pipe 30 until other service pipe outlets are located and accordingly marked with locator material 42. If appropriate, the locator material is allowed to dry and then the flexible tubular liner 28 is installed within the main pipe 30 such that the service pipe outlets 32 and the locator material 42 are covered thereby, as described in U.S. Pat. Nos. 4,009,063; 4,064,211; and 4,135,958.

After the flexible liner 28 has been installed within the main pipe 30 and has cured, the service pipe outlets 32 must be located within the main pipe 30 so that the portion of the liner 28 which overlaps or covers the service pipe outlet 32 can be cut away or removed. In the present embodiment, this function is accomplished by moving a sensor means within the main pipe 30 for sensing the locator material 42 on the other side of the liner 28 (i.e., through the liner 28) and for generating an indicator signal when the locator material 42 is sensed. The indicator signal is transmitted to the control assembly 22 for indicating to the operator that a service pipe outlet 32 is located adjacent the sensor means. The position of the service pipe outlet 32 is determined, thus allowing the liner 28 to be cut away so that fluid may flow between the service pipe 31 and the lined main pipe 30.

Figure 8:
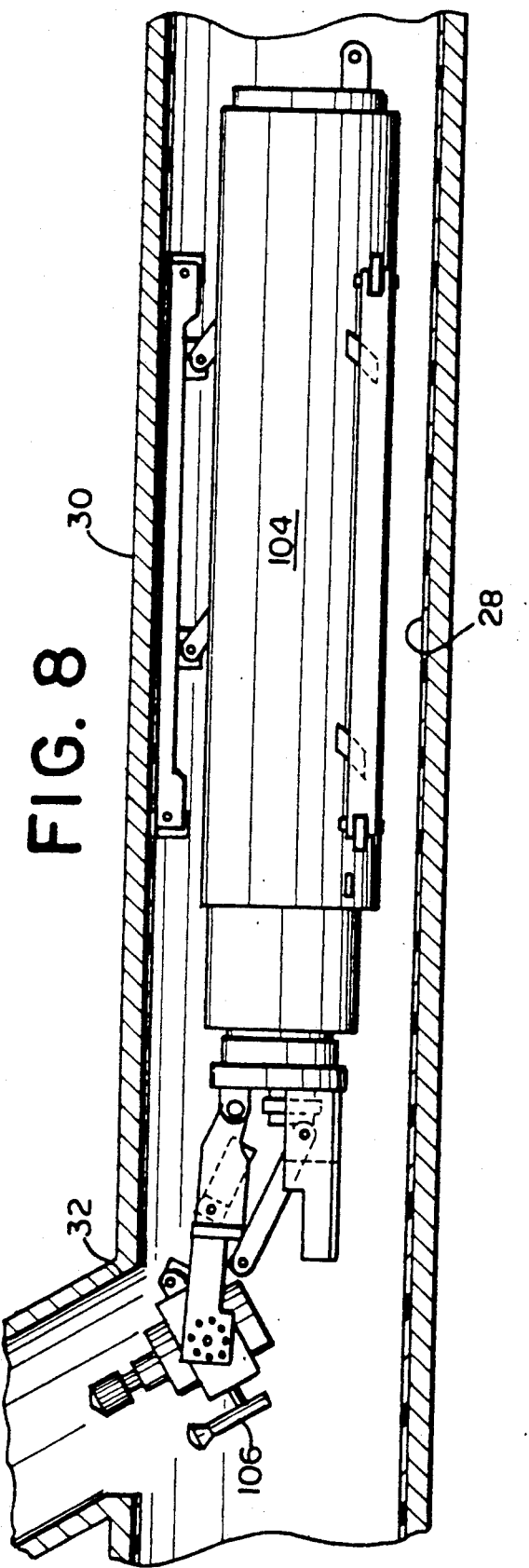
FIG. 8 is an enlarged elevational view of a conventional cutter apparatus employing a sensing device of the present invention installed within a subterranean sewer pipe showing a first use of the cutter.

Referring now to FIG. 8, in the present embodiment, the sensor means is preferably attached to the cutter apparatus 104 which is moved through the main pipe 30. Preferably, the cutter apparatus 104 is generally identical to that described in U.S. Pat. No. 4,819,721, except the cutter apparatus 104 additionally includes a sensor 106 for sensing the locator material 42 on the other side of the liner 28.

It is understood by those skilled in the art, that the present invention is not limited to any particular type of sensor 106. The sensor 106 is selected based on the type of locator material 42 utilized. That is, the sensor 106 can have an output transmitting capability and/or an input receiving capability to accommodate any particular type of locator material 42 selected and used. It is understood by those skilled in the art that the sensor 106 could be an electrical or magnetic sensor, such as a ferro magnetic sensor, eddy current generating thickness sensor, ultrasonic imaging sensor, optical sensor or an infrared sensor.

For instance, if the locator material 42 was mildly radioactive, the sensor 106 would have an input receiving capability for sensing radioactivity in the main pipe 30. However, it is also understood by those skilled in the art, that the sensor 106 could have an output capability which would operate in conjunction with the fifth structural unit 20. That is, the locator material 42 could be activated by ultraviolet light. The sensor 106 would transmit ultraviolet light as it moved through the main pipe 30 and upon the locator material 42 being activated or enlightened, the operator would be able to recognize the locator material 42 on the other side of the liner 28 by utilizing his television monitor. Consequently, when the sensor 106 transmits ultraviolet light, an indicator signal per se is not transmitted to the control assembly 22 for the operator to receive, but the operator would have to depend upon the television monitor to locate the service pipe outlet 32.

More particularly, the operational units of the cutting apparatus as described in U.S. Pat. No. 4,819,721, are installed within the main pipe 30, the camera and video subsassembly are activated to survey or scan the interior surface of the main pipe 30 to provide a visual display for the operator. Additionally, the sensor 106 is activated to sense for the locator material 42 on the other side of the liner 28. The cutting apparatus is slowly pulled forward along the main pipe 30 (toward the left when viewing FIG. 1) by the cable 38.

The sensor means senses the interior of the liner within the main pipe 30 for the presence of locator material 42. As mentioned previously, the presence of a service pipe outlet 32 is easy to detect because it will be located where the previously deposited locator material 42 was applied, and additionally because when the thermosetting liner 28 is installed within the main pipe 30 a depression or dimple is formed over the service pipe outlet 32 due to the pressures imposed upon the liner 28 during curing and the lack of support over the opening. Thus, the presence of locator material 42 on the other side of the liner 28, indicates the presence of a service pipe outlet 32 which must be opened to permit the free flow of sewage into the main pipe 30. The presence of a depression or a dimple in the liner 28, if visible, further evidences to the fact that a service pipe outlet 32 has been located.

Once the service pipe outlet 32 has been located, the cutter operates in a manner described in U.S. Pat. No. 4,819,721 to cut away the portion of the liner 28 which covers the service pipe outlet 32. However, it is understood by those skilled in the art, that the present invention is not limited to any particular type of cutter or sensing means. That is, instead of a hydraulically actuated cutter, an electrically actuated cutter or the like can be used to cut away the liner 28.

Figure 6:
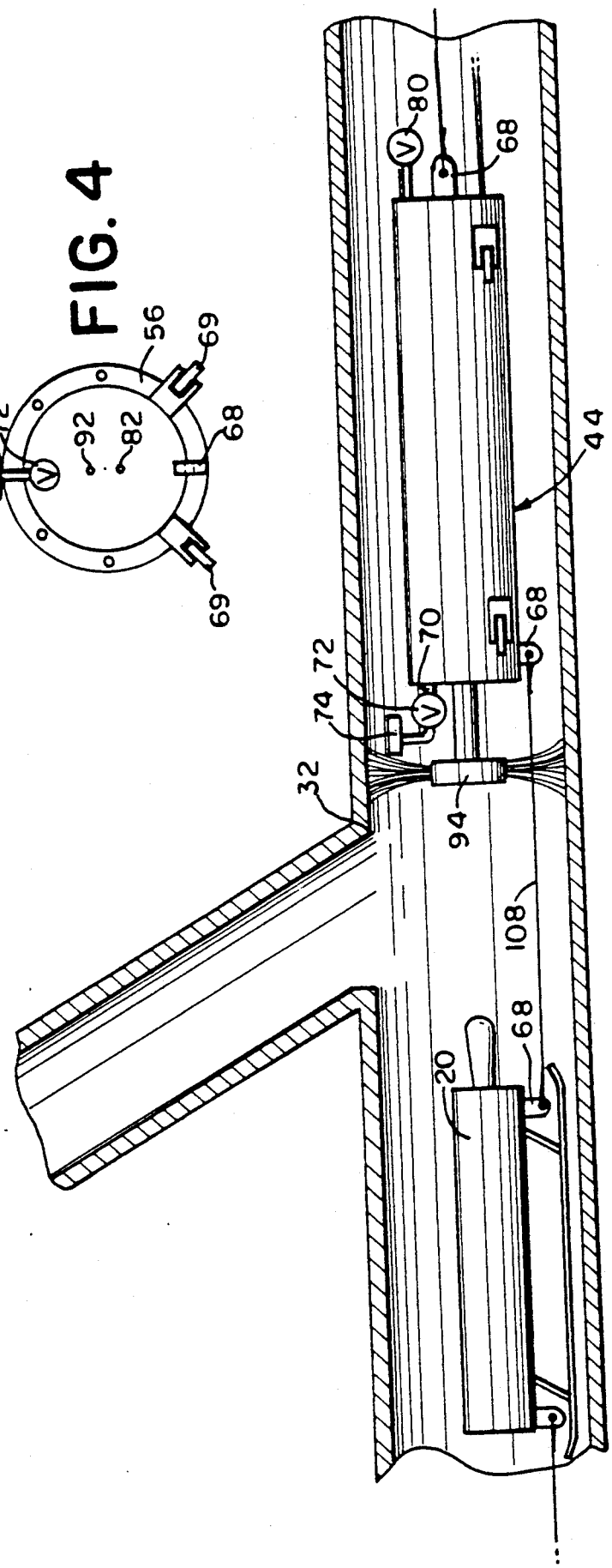
FIG. 6 is an enlarged elevational view of the first structural unit and monitoring device of the apparatus of FIG. 5.
Figure 5:
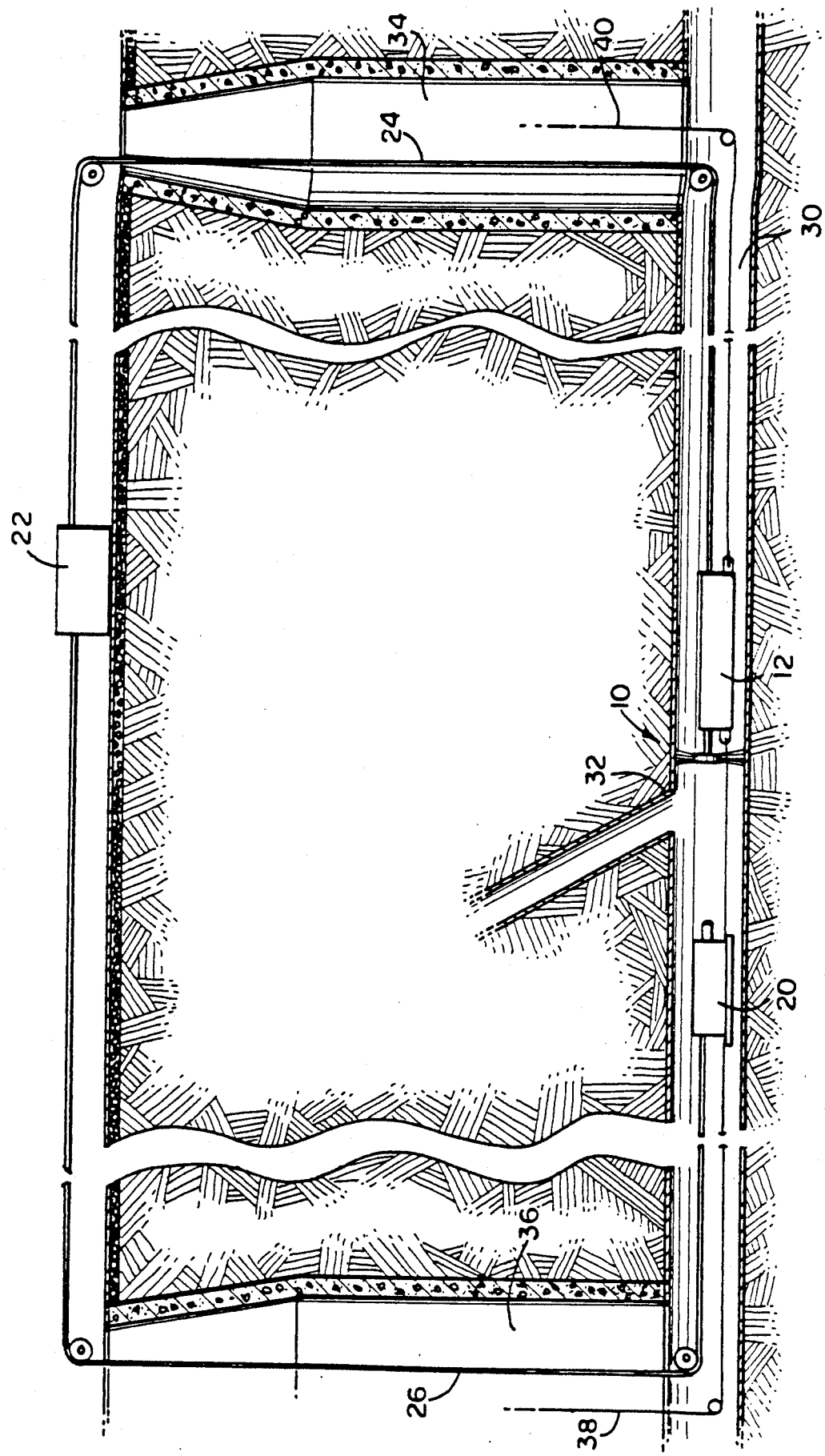
FIG. 5 is an elevational view of a second preferred embodiment of the remotely controlled locator material dispensing apparatus of the present invention installed within a subterranean sewer pipe.
Figure 7:
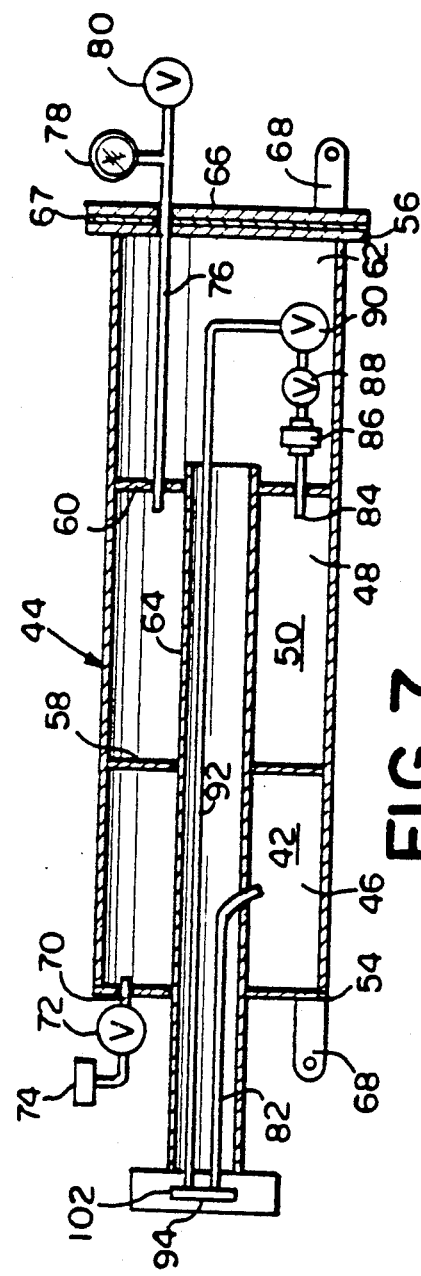
FIG. 7 is a greatly enlarged elevational view, partially in cross section of the first structural unit shown in FIG. 6.

Referring now to FIGS. 5 through 7, there is shown a dispensing apparatus 10 in accordance with a second preferred embodiment of the invention, wherein like numerals indicate like elements throughout. The dispensing apparatus 10 is generally identical to the dispensing apparatus discussed above in connection with the first preferred embodiment. Briefly, the primary difference is that the second, third and fourth structural units 14, 16 and 18 are omitted and the dispensing head 94 is fixedly mounted directly on the first structural unit 12, as shown in FIG. 7.

Referring now to FIG. 7, the first structural unit 12 is shown. Locator material dispensing means is positioned on the housing 44 for receiving and dispensing the locator material 42 and the pressurized gas 50. The locator material dispensing means in the fluid communication with the valve means (as described above) for receiving the pressurized gas 50 therefrom. The locator material dispensing means is also in fluid communication with the storage chamber 46 such that when the pressurized gas is received and dispensed by the locator material dispensing means, locator material 42 is drawn from the storage chamber 46 into the locator material dispensing means and dispensed with the pressurized gas 50.

In the second preferred embodiment, the locator material dispensing means comprises the dispensing head 94. As can be seen, the small conduit 64 extends generally outwardly from the housing 44 through a suitably sized opening in the end plate 54. The dispensing head 94 is preferably threadably secured to the small conduit 64 with the outlet ports 102 in fluid communication with the second gas conduit 92 and the draw tube 82. The operation of the first structural unit 12 of the second preferred embodiment is generally identical to the operation described above and, therefore, it is not believed necessary to repeat the entire operation as the differences are minor enough to allow one of ordinary skill in the art to operate the first structural unit 12 in accordance with the second embodiment.

As shown in FIG. 6, monitoring means is coupled to the first structural unit 12 such that the monitoring means moves with the first structural unit 12 when the first structural unit 12 moves within the conduit or main pipe 30 and for remotely monitoring the first structural unit 12 and the interior surface of the main pipe 30. The monitoring means and first structural unit 12 are coupled together in the same manner as the structural units described above. More specifically, the monitoring means preferably comprises video means coupled to the housing 44, such that the video means moves with the housing 44 when the housing 44 moves within the conduit. Preferably, the video means is comprised of a video assembly, as described above in connection with the first preferred embodiment.

Since the dispensing head 94 is directly or fixedly connected to the first structural unit 12, it is unable to move with respect thereto. Therefore, the dispensing head 94 cannot be positioned directly within the service pipe outlet 32 or the service pipe 31. The dispensing head 94 deposits the locator material 42 directly on the interior surface of the main pipe 30. Any locator material 42 which is deposited on the service pipe outlet 32 or therewithin, is received from the dispensing head 94 which is located in the main pipe 30.

The advantages of the second preferred embodiment is that it is a simpler system to use and operate. Specifically, the first structural unit 12 is filled with the locator material 42 and pressurized gas 50, as described above. The first structural unit 12 and the fifth structural unit 20 are then connected together by the cable 108 and placed inside the main pipe 30 through the down-stream manhole 34. The units are pulled forward by the cable 38, which is attached to the fifth structural unit 20, until the dispensing head 94 is positioned adjacent the beginning of a connecting point of the main pipe 30 and a service pipe outlet 32 as observed by a remotely positioned operator who is visually monitoring the interior of the main pipe 30 through the fifth structural unit 20. When the service pipe outlet 32 is located, the operator activates the solenoid controlled gas valve 90 which causes the locator material 42 to be sprayed out the dispensing head 94, as discussed above, onto an interior area of the main pipe 30. Preferably, as the locator material 42 is being dispensed from the dispensing head 94, the first structural unit 12 is moved from one side of the service pipe outlet 32 to the other side of said service pipe outlet 32 by pulling the cable 38 to the left to thereby fully mark the service pipe outlet 32.

After the main pipe 30 has had locator material 42 deposited thereon at the pertinent locations which indicate the service pipe outlet 32, the remaining operation of lining and cutting out the service pipe outlets as described above is carried out.

Referring now to FIGS. 9 and 10, there is shown a dispensing apparatus in accordance with a third preferred embodiment of the invention, wherein like numerals indicate like elements throughout. In the third preferred embodiment, it is preferred that the dispensing apparatus to be a push-in type dispensing device 112, as in understood by those skilled in the art. The push-in type dispensing device 112 preferably deposits locator material 42 directly on the flexible liner 28 after it has been installed within the main pipe 30.

Referring now to FIG. 9, there is shown the main pipe 30 positioned beneath the street 118 and extending generally parallel thereto. The main pipe 30 is preferably connected to a service pipe 31 for receiving sewage from a housing or building (not shown) situated approximate the street 118 or main pipe 30. The service pipe 31 is connected to a wye 120 and extends upwardly to the service pipe bend 122. The service pipe 31 is comprised of a series of bell-joint sections 124 interconnected between the service pipe bend 122 and the wye 120. Preferably, a clean-out fitting 109 has previously been installed or is installed between the service pipe bend 122 and a coupling 126, as is understood by those skilled in the art. A clean-out housing 110 is provided above and around the clean-out fitting 109 for the protection thereof.

As shown in FIG. 10, the push-in type dispensing device 112 preferably includes a dispensing head 115 attached to the proximal end of the dispensing device 112. The dispensing head 115 is constructed in a manner known to those skilled in the art and is in fluid communication with a source of locator material 42 and a source of pressurized air (not shown) for dispensing the locator material 42.

To locate the service pipe outlet 32 in accordance with the third preferred embodiment, the flexible tubular liner 28 is first installed within the main pipe 30 such that the service pipe outlet 32 is covered thereby. The flexible tubular liner 28 is installed within the main pipe 30 prior to marking the service pipe outlet 32 with locator material 42, as opposed to the first and second embodiments of the present invention.

After the flexible tubular liner 28 has cured, the push-in type dispensing 112 is installed within the service pipe 31 through the clean-out fitting 109 such that the dispensing head 115 is positioned adjacent the service pipe outlet 32 and the exposed area of the cured liner 28. The locator material 42 is then deposited onto the exposed cured liner 28 at said service pipe outlet 32.

The means for sensing the locator material 42, is then moved within the main pipe 30 for sensing the locator material 42 through the liner 28 and for generating an indicator signal when the sensor means senses the locator material 42, as described in detail above.

While the above description is directed to three embodiments for employing the present invention, it is understood by those skilled in the art, that other methods nad instrumentalities could be used without departing from the spirit and scope of the invention. For instance, the first preferred embodiment utilizes three structural units to remotely position the dispensing head 94. It is within the spirit and scope of the invention to utilize a single assembly for remotely positioning the dispensing head 94 within the service pipe 31 and main pipe 30, in addition to the first structural unil 12 and the fifth structural unit 20. Additionally, it is recognized that the present invention is not limited to the specific means for dispensing the locator material 42, but that it is within the spirit and scope of the invention to utilize other methods and instrumentalities for dispensing the locator material 42. For instance, the first structural unit 12 could be comprised of mainly a mechanical actuator (e.g., spring actuated) or, on the other hand, the locator material 42 could be stored in a premixed pressurized condition.

From the foregoing description, it can be seen that the present invention comprises a remotely controlled locator material dispensing apparatus for use within a conduit having an axis to mark specific conduit locations for later identification and a method for accomplishing the same. It is recognized by those skilled in the art, that changes may be made to the above-described embodiments of the invention without departing from the broad inventive concepts thereof. It is understood, therefore, that this invention is not limited to the particular embodiments disclosed, but is intended to cover any modifications which are within the scope and spirit of the invention as defined by the appended claims.

We claim:

1. A method of locating a service pipe outlet transversely connected to a main pipe having an axis after a flexible liner has been installed in the main pipe, said method comprising the steps of:

locating a position of a service pipe outlet within said main pipe;

depositing a locator material on an interior surface of said main pipe adjacent the position of said service pipe outlet;

installing a flexible tubular liner within said main pipe such that said service pipe outlet and said locator material is covered thereby; and moving sensor means within said main pipe along said axis for sensing said locator material through said liner and for generating an indicator signal when said sensor means senses said locator material, whereby the position of the service pipe outlet is determined for allowing the liner to be cut away so that fluid may flow between said service pipe and said lined main pipe.

2. The method as recited in claim 1, wherein the step of depositing a locator material on an interior surface of said main pipe adjacent said service pipe outlet further includes the step of depositing locator material on an interior surface of said service pipe outlet.

3. The method as recited in claim 1, wherein the step of depositing a locator material on an interior surface of said main pipe adjacent said service pipe outlet comprises the steps of:

providing a first structural unit including a source of locator material to be dispensed onto an interior surface of said main pipe;

moving said first structural unit within said main pipe to a position adjacent the position of said service pipe outlet; and depositing said locator material on an interior surface of said main pipe adjacent said service pipe outlet.

4. The method as recited in claim 1, wherein the step of depositing locator material on an interior surface of said main pipe adjacent the position of said service pipe outlet comprises the steps of:

providing a first structural unit including a source of locator material to be dispensed onto an interior surface of said conduit;

positioning said first structural unit within said main pipe on one side of said service pipe outlet and adjacent thereto; and moving said first structural unit axially within said main pipe to another side of said service pipe outlet and adjacent thereto, while simultaneously depositing said locator material on an interior surface of said main pipe therebetween.

5. The method as recited in claim 1, wherein the step of locating a position of a service pipe outlet within said main pipe comprises:

visually monitoring the interior surface of said main pipe from a remote location.

6. The method as recited in claim 5, wherein the step of visually monitoring the interior surface of said main pipe from a remote location comprises:

moving video means along said axis of said main pipe.

7. The method as recited in claim 1, wherein the step of depositing locator material on an interior surface of said main pipe adjacent the position of said service pipe outlet further comprises the step of:

deposting locator material on an interior surface of said service pipe outlet.

8. A method of locating a service pipe outlet of a service pipe transversely connected to a main pipe having an axis after a liner has been installed in the main pipe, said method comprising the steps of:

installing a tubular liner within said main pipe such that a service pipe outlet within said main pipe is covered thereby;

depositing a locator material different from said tubular liner on said tubular liner at said service pipe outlet; and moving sensor means within said main pipe along said axis for sensing said locator material on said liner and for generating an indicator signal when said sensor means senses said locator material, whereby the position of the service pipe outlet along said main pipe is determined for allowing the liner to be cut away so that fluid may flow between said service pipe and said lined main pipe.

9. The method as recited in claim 8, wherein the step of depositing a locator material on said tubular liner at said service pipe outlet comprises the steps of:

providing a dispensing device in fluid communication with a source of locator material for dispensing said locator material onto said tubular liner;

moving said dispenser device within the service pipe to a position adjacent said service pipe outlet and said tubular liner; and depositing said locator material on said tubular liner at said service pipe outlet.

* * * * *